Dec. 23, 1930.　　　　O. A. PELZ　　　　1,785,875

AUTOMOBILE THEFT ALARM

Filed April 26, 1930

INVENTOR
Otto A. Pelz
BY
Pennie, Davis, Marvin and Edmonds
HIS ATTORNEY

Patented Dec. 23, 1930

1,785,875

UNITED STATES PATENT OFFICE

OTTO A. PELZ, OF BROOKLYN, NEW YORK

AUTOMOBILE THEFT ALARM

Application filed April 26, 1930. Serial No. 447,530.

This invention relates to vehicle theft alarms particularly intended for automobiles, and of that type in which a loud audible alarm is sounded in the event that the vehicle is moved by an unauthorized person. More especially the invention relates to improvements in vehicle alarms of the sort described in United States Patent No. 1,365,744 granted January 18, 1921 to Louis Stottmeister.

In the vehicle alarm just referred to, a striker is mounted on the drive shaft of the motor vehicle and a bell or gong is arranged so as to be moved into and out of the path of this rotary striker. A lock is provided by which the bell may be locked in the path of the rotary striker by the owner of the vehicle when he leaves the vehicle unguarded.

The object of my invention is to provide a vehicle alarm of this type which is thoroughly practicable and which can be applied to a motor vehicle, either in the course of its manufacture, or afterward, at a reasonable, and in fact, an extremely low cost.

The invention will be understood by a consideration of the accompanying drawings taken together with the following detailed description:

Figure 1:
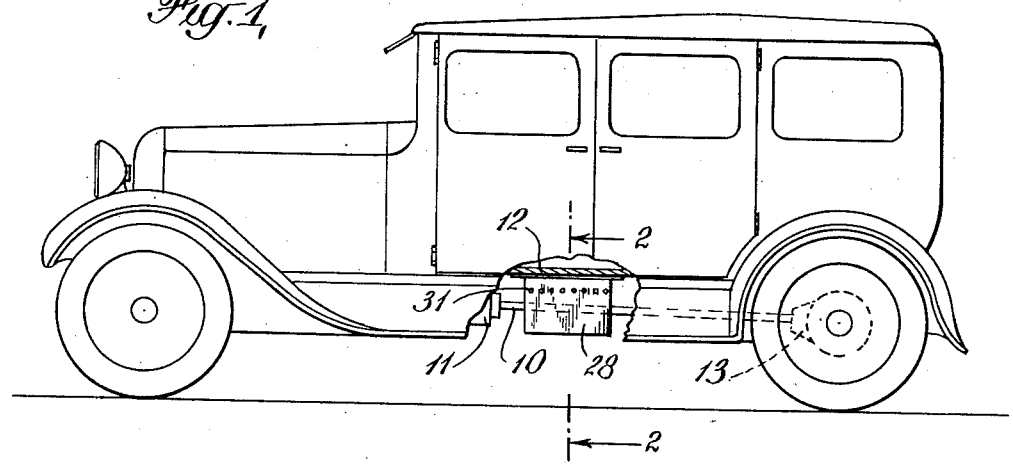
Fig. 1 is a side view of a motor vehicle with the lower central part thereof broken away to show the application of the alarm device of the invention.

Referring now to the accompanying drawings, the vehicle is provided with a propeller or drive shaft 10 extending rearwardly from the transmission 11 beneath the floor 12 to the differential housing 13 on the rear axle. Mounted to rotate with the drive shaft 10 are a pair of strikers 14 each consisting for example of a steel ball securely fixed to the outer end of a flexible arm 15.

These arms 15 may conveniently be made of spring steel or other suitable resilient material. The arms are firmly attached to a pair of clamps 16 which embrace the drive shaft 10 and are firmly secured thereto preferably by means of rivets 17 so that once the striker device is attached to the drive shaft it will not be apt to work loose and cannot be removed without great difficulty.

Mounted beneath the floor 12 is a lock casing 18. This casing is mounted in any suitable manner in such a way that it cannot be easily moved from its intended position. It preferably is secured directly to the under side of the floor 12 by means of small bolts 19.

A bar 20 is arranged to slide within the lock casing 18 and the casing is so positioned that the bar 20 moves at right angles to the drive shaft 10. In the form of lock shown in Figs. 2 and 3, the bar 20 extends to the left of the lock casing and is firmly supported in a pair of parallel guides 21.

A vertical rod or post 22 is firmly fixed to bar 20 near its outer end, and on the lower end of this rod a bell or gong 23 is supported. The length of rod 22 is sufficient to suspend the lower edge of gong 23 approximately level with the center line of drive shaft 10.

The lock casing 18 is provided with a key-receiving mechanism 24 which preferably extends up through the floor 12 so that a key 25 may be easily inserted in the mechanism 24. The key-receiving mechanism 24 is located just forward of the front seat so that it is convenient for the driver to reach down and actuate the key. A guard 26 is provided around the key-receiving mechanism to prevent the collection of sand or other foreign matter in the lock mechanism.

Figure 2:
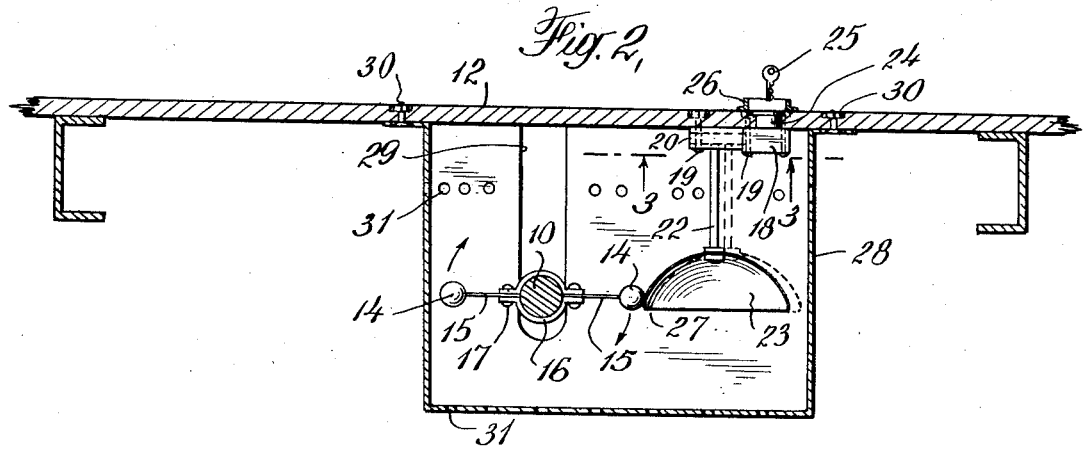
Fig. 2 is a transverse vertical section taken on line 2—2 of Fig. 1 through the alarm mechanism.
Figure 3:
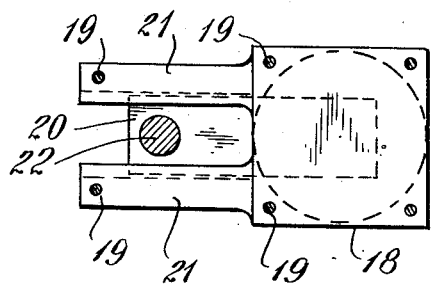
Fig. 3 is a bottom view of the lock taken on line 3—3 of Fig. 2.

The turning of key 25 within the mechanism 24 effects the movement of bar 20 to move the gong 23 from the full to the dotted position shown in Fig. 2 and vice versa. When in the full position the rim of the gong is in the path of the strikers 14 so that the rotation of these strikers causes the gong to be loudly sounded.

The rim of the gong is preferably spun inwardly as indicated at 27 so as to prevent either the gong or the strikers from being damaged in case the vehicle is operated in the backward direction. The arrows shown in Fig. 2 indicate the direction of rotation of the drive shaft as the vehicle moves forward. The curvature of the strikers 14 is sufficient to prevent damage to the parts in the event of rearward motion of the vehicle, but the inward turning of the rim as indicated at 27 aids in deflecting the strikers and softens the blows upon the gong.

By turning the key 25 in the reverse direction, the bar 20 is slid backward withdrawing the gong 23 to the dotted position in which it is out of the path of the strikers. It will be understood that when an authorized operator of the motor vehicle desires to operate the car, he inserts the key 25 and moves the gong 23 to the dotted position, and when he desires to leave the car he turns the key to move the gong to ringing position shown in the full lines.

A housing 28 surrounds the entire mechanism and is slotted as indicated at 29 so that it may be placed in position with the propeller shaft 10 passing through it. The housing is preferably secured to the floor 12 all around its periphery by means of a large number of small bolts or rivets 30 so that it will require a considerable length of time to remove it, the idea being that in case the motive for removing the casing should be to displace the alarm mechanism so as to render it inoperative, such a long time would be required that the risk of detection would be too great.

The housing 28 is provided with numerous small apertures 31 so that the sound of the gong 23 will not be muffled. These apertures are preferably placed near the top of the housing and in the bottom thereof, and are of such small size that it is impossible to insert a tool which would be effective in displacing the gong 23 from its intended position.

Figure 4:
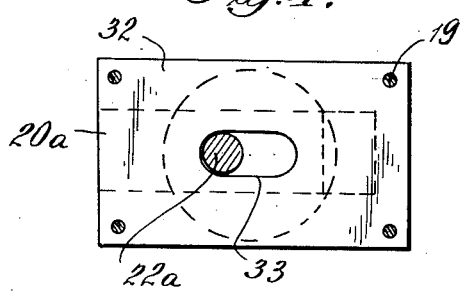
Fig. 4 is a similar view of a modified form of lock.

In the modified form of lock shown in Fig. 4, the lock casing 32 is provided with a slot 33 through which the rod 22a passes. The bar 20a does not project beyond the end of the casing as in the case of the bar 20 and the guides 21 are omitted. This makes a somewhat more compact and cheaper construction.

It will be understood from the above description that my improved vehicle alarm mechanism is of extremely simple construction. It consists merely of the lock, gong, gong support and striker, together with the housing which protects these parts. These parts are few in number and of simple design; there are no parts which require accurate machine work except the key-receiving mechanism, that is, the cylinder and tumblers and this mechanism is common to all locks of good quality.

By placing the lock adjacent the rotary drive shaft, and mounting the gong practically upon the lock mechanism itself, the alarm mechanism has been greatly simplified, and a large number of expensive parts have been eliminated. Moreover, the arrangement of the parts in my improved vehicle alarm is such that the device can be sold for installation on vehicles already in use at an attractive price.

I claim:

1. In a vehicle alarm for vehicles having a drive shaft extending beneath the floor of the vehicle, a striker flexibly secured to the drive shaft and rotating therewith, a lock mounted adjacent said rotary shaft, said lock having a slide bar, and a gong mounted on said bar, said bar being slidable to carry the gong into and out of the path of the striker on said rotary shaft.

2. In a vehicle alarm for vehicles having a drive shaft extending beneath the floor of the vehicle, a striker flexibly secured to the drive shaft and rotating therewith, a lock mounted adjacent said rotary shaft, said lock having a slide bar and a gong mounted on said bar, and a key mechanism in said lock, said bar being slidable by the turning of said key mechanism to carry the gong into and out of the path of the striker on said rotary shaft.

3. In a vehicle alarm for vehicles having a drive shaft extending beneath the floor of the vehicle, a striker flexibly secured to the drive shaft and rotating therewith, a lock mounted adjacent said rotary shaft, said lock having a gong mounted thereon and adapted to be moved by the lock into and out of the path of the striker on said rotary shaft, and a housing surrounding said rotary striker and said lock and gong, and secured to the floor of the vehicle.

In testimony whereof I affix my signature.

OTTO A. PELZ.